United States Patent
Gao et al.

(10) Patent No.: US 11,480,963 B2
(45) Date of Patent: Oct. 25, 2022

(54) VEHICLE INTENT PREDICTION NEURAL NETWORK

(71) Applicant: Waymo LLC, Mountain View, CA (US)

(72) Inventors: Jiyang Gao, San Jose, CA (US); Junhua Mao, Palo Alto, CA (US); Yi Shen, Sunnyvale, CA (US); Congcong Li, Cupertino, CA (US); Chen Sun, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 250 days.

(21) Appl. No.: 16/723,787

(22) Filed: Dec. 20, 2019

(65) Prior Publication Data

US 2021/0191395 A1    Jun. 24, 2021

(51) Int. Cl.
| | |
|---|---|
| *G01C 22/00* | (2006.01) |
| *G05D 1/00* | (2006.01) |
| *G06K 9/62* | (2022.01) |
| *G05D 1/02* | (2020.01) |
| *B60W 60/00* | (2020.01) |

(Continued)

(52) U.S. Cl.
CPC ..... *G05D 1/0088* (2013.01); *B60W 60/00276* (2020.02); *G05D 1/0212* (2013.01); *G05D 1/0274* (2013.01); *G06K 9/6232* (2013.01); *G06V 20/58* (2022.01); *G06V 20/588* (2022.01); *G05D 2201/0212* (2013.01); *G06V 2201/08* (2022.01)

(58) Field of Classification Search
CPC .......... B60W 60/00276; G05D 1/0088; G05D 1/0212; G05D 1/0274; G05D 2201/0212; G06K 9/00798; G06K 9/00805; G06K 9/6232; G06K 2209/23
USPC ........................................................ 701/25
See application file for complete search history.

(56) References Cited

U.S. PATENT DOCUMENTS

| | | | |
|---|---|---|---|
| 9,691,286 B2 | 6/2017 | Bahrami et al. | |
| 2019/0129436 A1* | 5/2019 | Sun ........................ | G06N 7/005 |

(Continued)

FOREIGN PATENT DOCUMENTS

KR    1020190073038    6/2019

OTHER PUBLICATIONS

PCT International Search Report and Written Opinion in International Appln. No. PCT/US2020/066123, dated Apr. 12, 2021, 10 pages.

(Continued)

*Primary Examiner* — Mahmoud S Ismail
(74) *Attorney, Agent, or Firm* — Fish & Richardson P.C.

(57) ABSTRACT

Methods, systems, and apparatus, including computer programs encoded on a computer storage medium, for generating vehicle intent predictions using a neural network. One of the methods includes obtaining an input characterizing one or more vehicles in an environment; generating, from the input, features of each of the vehicles; and for each of the vehicles: processing the features of the vehicle using each of a plurality of intent-specific neural networks, wherein each of the intent-specific neural networks corresponds to a respective intent from a set of intents, and wherein each intent-specific neural network is configured to process the features of the vehicle to generate an output for the corresponding intent.

20 Claims, 5 Drawing Sheets

(51) Int. Cl.
  *G06V 20/58* (2022.01)
  *G06V 20/56* (2022.01)

(56) References Cited

U.S. PATENT DOCUMENTS

| | | | |
|---|---|---|---|
| 2019/0147610 A1 | 5/2019 | Frossard et al. | |
| 2019/0287402 A1 | 9/2019 | Aoude et al. | |
| 2019/0302767 A1* | 10/2019 | Sapp | G01S 17/58 |
| 2019/0329763 A1* | 10/2019 | Sierra Gonzalez | G08G 1/166 |
| 2021/0097398 A1* | 4/2021 | Snell | B60W 40/105 |
| 2021/0139022 A1* | 5/2021 | Tao | B60W 30/0956 |

OTHER PUBLICATIONS

Rathore et al., "A Scalable Framework for Trajectory Prediction," CoRR, Jun. 2018, arxiv.org/abs/1806.03582v1, 14 pages.
Bengio et al., "Curriculum learning," Proceedings of the 26th Annual International Conference on Machine Learning, Jun. 2009, 41-48.
Cleeremans et al., "Finite State Automata and Simple Recurrent Networks," Neural Computation, 1989, 1(3):372-381.
He et al., "Deep Residual Learning for Image Recognition," 2016 IEEE Conference on Computer Vision and Pattern Recognition (CVPR), Jun. 2016, 770-778.
Krizhevsky et al., "ImageNet Classification with Deep Convolutional Neural Networks," Advances in Neural Information Processing Systems 25 (NIPS 2012), 2012, 9 pages.
Peng et al., "Multi-parameter prediction of drivers' lane-changing behaviour with neural network model," Applied Ergonomics, Sep. 2015, 50: 207-217.
Vaswani et al., "Attention is All you Need," Advances in Neural Information Processing Systems 30 (NIPS 2017), 2017, 11 pages.
Xin et al., "Intention-aware Long Horizon Trajectory Prediction of Surrounding Vehicles using Dual LSTM Networks," 21st International Conference on Intelligent Transportation Systems (ITSC), Nov. 2018, 6 pages.
Zyner et al., "Long Short Term Memory for Driver Intent Prediction," 2017 IEEE Intelligent Vehicles Symposium (IV), Jun. 2017, 1484-1489.

* cited by examiner

VEHICLE INTENT PREDICTION NEURAL NETWORK

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to predict nearby objects' intent and trajectory. Predicting road user's intent and trajectory correctly and timely is one of the keys to make control and navigation decisions.

Some autonomous vehicles have computer systems that implement neural networks for object classification within images. For example, a neural network can be used to determine that an image captured by an on-board camera is likely to be an image of a nearby car.

Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the network thus involves continually performing a forward pass on the input, computing gradient values, and updating the current values for the set of parameters for each layer. Once a neural network is trained, the final set of parameters can be used to make predictions in a production system.

Convolutional neural networks include convolutional neural network layers. Convolutional neural network layers have a neuron connectivity that takes advantage of spatially local correlation in the input data. To do so, convolutional neural network layers have sparse connectivity, with neurons in one convolutional layer receiving input from only a small subset of neurons in the previous neural network layer. The other neurons from which a neuron receives its input defines a receptive field for that neuron.

Convolutional neural network layers have one or more parameters that define one or more filters for each layer, with each filter having one or more parameters. A convolutional neural network layer generates an output by performing a convolution of each neuron's filter with the layer's input.

In addition, each convolutional network layer can have neurons in a three-dimensional arrangement, with depth, width, and height dimensions. The width and height dimensions correspond to the two-dimensional features of the layer's input. The depth-dimension includes one or more depth sublayers of neurons. Convolutional neural networks employ weight sharing so that all neurons in a depth sublayer have the same weights. This provides for translation invariance when detecting features in the input.

Convolutional neural networks can also include fully-connected layers and other kinds of layers. Neurons in fully-connected layers receive input from each neuron in the previous neural network layer.

Autonomous and semi-autonomous vehicle systems can use full-vehicle predictions for making driving decisions. A full-vehicle prediction is a prediction about a region of space that is occupied by a vehicle. The predicted region of space can include space that is unobservable to a set of on-board sensors used to make the prediction.

Autonomous vehicle systems can make full-vehicle predictions using human-programmed logic. The human-programmed logic specifies precisely how the outputs of on-board sensors should be combined, transformed, and weighted, in order to compute a full-vehicle prediction.

SUMMARY

This specification describes systems and techniques for predicting vehicle intents using neural networks.

In a first aspect there is provided a method that includes obtaining an input characterizing one or more vehicles in an environment; generating, from the input, features of each of the vehicles; and for each of the vehicles: processing the features of the vehicle using each of a plurality of intent-specific neural networks, wherein each of the intent-specific neural networks corresponds to a respective intent from a set of intents, and wherein each intent-specific neural network is configured to process the features of the vehicle to generate an output for the corresponding intent that includes: (i) a confidence score that represents a predicted likelihood that the vehicle will follow the intent that corresponds to the intent-specific neural network, and (ii) a predicted trajectory that would be followed by the vehicle in a future time period if the vehicle follows the intent that corresponds to the intent-specific neural network.

The first aspect can also optionally include one or more of the below features.

In some implementations, the method also includes providing the outputs from the plurality of intent-specific neural networks for the one or more vehicles to a planning system that plans navigation of an autonomous vehicle navigating in the environment.

In some implementations, the input comprises, for each of the one or more vehicles, an appearance embedding of the vehicle that characterizes an appearance of the vehicle as sensed by one or more sensors of a particular other vehicle in the environment.

In some implementations, the input comprises one or more images of the environment, and generating the features of each of the vehicles comprises: processing the one or more images of the environment using a convolutional neural network to generate a feature map that includes a respective feature vector for each of a plurality of positions in the environment; and generating, for each of the vehicles, features based on the feature vectors in the feature map.

In some implementations generating, for each of the vehicles, features based on the feature vectors in the feature map comprises: obtaining a position of the vehicle in each of the one or more images of the environment; obtaining a plurality of cropped feature vectors, comprising a respective feature vector for each position of the vehicle by cropping the feature map based on each position of the vehicle; and generating a trajectory feature map of the vehicle by performing average-pooling operation over the plurality of cropped feature vectors.

In some implementations, generating, for each of the vehicles, features based on the feature vectors in the feature map comprises: generating a context feature map of the vehicle by performing average-pooling operation over the feature vectors in the feature map.

In some implementations, generating, for each of the vehicles, features based on the feature vectors in the feature map comprises: applying a self-attention mechanism to the feature map to generate an attended feature map; and generating the features based on the attended feature map.

In some implementations, for each of the one or more vehicles, the predicted trajectory comprises predicted positions of the vehicle at each of a plurality of future time steps.

In some implementations, each intent-specific neural network is one or more fully-connected neural network layers that are configured to generate the output for the corresponding intent from the features.

In some implementations, each intent-specific neural network comprises: one or more fully-connected neural network layers that are configured to generate the confidence score; and one or more auto-regressive neural network layers that are configured to auto-regressively generate the predicted trajectory.

In some implementations, the one or more auto-regressive neural network layers are recurrent neural network layers.

In some implementations, for each of the one or more vehicles, the predicted trajectory comprises predicted positions of the vehicle for each of a plurality of future time steps, wherein the plurality of future time steps are divided into a plurality of partitions, and wherein the auto-regressive neural network layers are configured to generate, for each partition, the predicted positions of the vehicle for the partition conditioned on predicted positions for earlier partitions.

In some implementations, each partition includes more than one future time step.

In some implementations, each intent is a different possible long-term action goal for the vehicle and wherein each predicted trajectory is a sequence of predicted positions of the vehicle.

In some implementations, the set of intents includes one or more of: going straight, turning left, turning right, left lane change, right lane change, remaining stationary, or reversing.

In a second aspect there is provided a system including: one or more computers; and one or more storage devices communicatively coupled to the one or more computers, where the one or more storage devices store instructions that, when executed by the one or more computers, cause the one or more computers to perform operations including the operations of the method of the first aspect.

In a third aspect there are provided one or more non-transitory computer storage media storing instructions that, when executed by one or more computers, cause the one or more computers to perform operations including the operations of the method of the first aspect.

Particular embodiments of the subject matter described in this specification can be implemented so as to realize one or more of the following advantages.

Conventionally, autonomous vehicles have computer systems that implement an onboard behavior prediction (BP) system to predict a nearby vehicle's intent or trajectory. The BP system mainly relies on heuristic rules to make these predictions. However, for the cases that heuristic rules cannot cover, the BP system may fail to predict correct trajectory timely.

An autonomous or semi-autonomous vehicle system can use vehicle intent prediction neural networks, including a plurality of intent-specific neural networks, to predict intents of one or more nearby vehicles. The vehicle intent neural network can use raw input data characterizing one or more vehicles in the environment, reducing the risk of failures that occur in traditional, heuristic-based approaches. The system can determine a confidence score that represents a predicted likelihood that the nearby vehicle will follow the intent that corresponds to each intent-specific neural network. Additionally, the system can predict a trajectory that would be followed by the nearby vehicle in a future time period if the vehicle follows the intent that corresponds to each intent-specific neural network. The system can provide the vehicle intent outputs to a planning system, and the planning system can plan navigation of the autonomous vehicle based on the predicted nearby vehicles' intents. More generally, by being able to accurately predict nearby vehicles' intents and the trajectories that those vehicles would likely follow given a predicted intent, the autonomous vehicle can make better autonomous driving decisions or can provide better semi-autonomous driving recommendations for the operator of the vehicle.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a machine learning model, e.g., fully-learned neural network, to predict a vehicle's intent and trajectory by utilizing input data that characterizes appearance and context information of the vehicle in the environment. As used in this description, a "fully-learned" machine learning model is a model that is trained to compute a desired prediction. In other words, a fully-learned model generates an output based solely on training data rather than on human-programmed decision logic. The vehicle intent prediction can include one or more predicted intents that the vehicle is likely to follow and one or more corresponding predicted trajectories that would be followed by the vehicle in a future time period.

A vehicle intent describes where the vehicle plans to go, i.e., a long-term action goal. The vehicle intent can be organized into multiple categories that each correspond to a different intent. Examples of intent categories can include any of going straight, turning left, turning right, left lane change, right lane change, stationary and reversing. A trajectory describes where the vehicle is likely to go, i.e., a short-term execution result. In some cases, the short term execution results are aligned with the long-term action goal. But in some cases, the execution result can be different from the original intent.

For example, a car A plans to turn left at an intersection, but the car A stopped due to a red light. So the short-term execution result, i.e., trajectory, is being stationary. As another example, a car A plans to make a left lane change, but there is another car B driving in parallel with A in the left lane. So the short term execution of A is likely to be straight acceleration or deceleration to avoid B and then making the lane change.

Predicting a vehicle's intent and trajectory correctly and in a timely fashion is important to solving many autonomous driving issues. This specification describes a system that uses a machine learning model for trajectory and intent prediction based on effective modeling of scene-level context information and appearance information, including the road graph, the dynamics of perception objects, and the self-driving car (SDC) itself.

Figure 1:
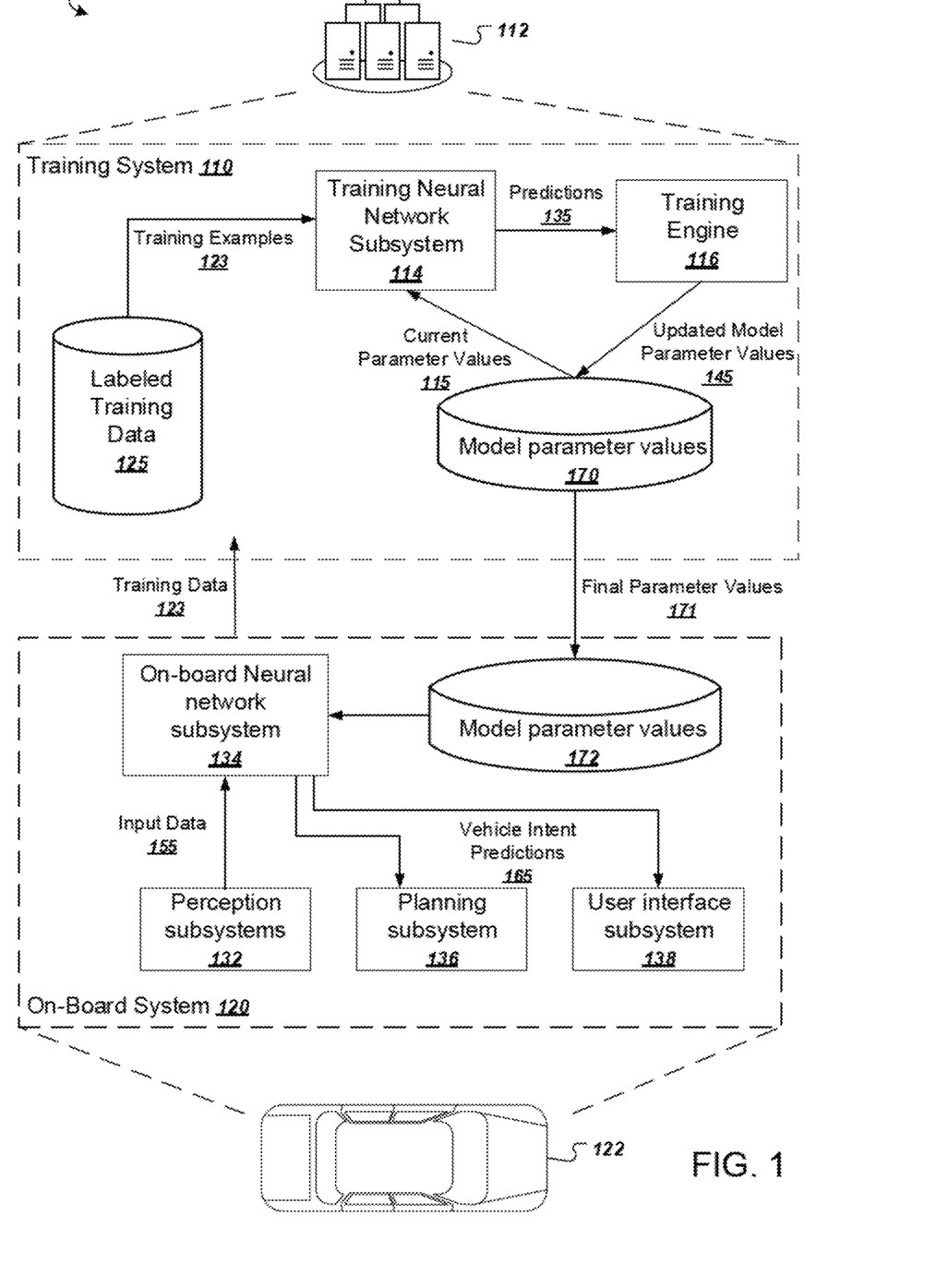
FIG. 1 is a diagram of an example system.

FIG. 1 is a diagram of an example system 100. The system 100 includes a training system 110 and an on-board system 120.

The on-board system 120 is physically located on-board a vehicle 122. Being on-board the vehicle 122 means that the on-board system 120 includes components that travel along with the vehicle 122, e.g., power supplies, computing hardware, and sensors. The vehicle 122 in FIG. 1 is illustrated as an automobile, but the on-board system 120 can be located on-board any appropriate vehicle type. The vehicle 122 can be a fully autonomous vehicle that uses vehicle intent predictions to inform fully-autonomous driving decisions. The vehicle 122 can also be a semi-autonomous vehicle that uses vehicle intent predictions to aid a human driver. For example, the vehicle 122 can autonomously apply the brakes if a vehicle intent prediction indicates that a human driver is about to collide with another vehicle.

The on-board system 120 includes one or more perception subsystems 132. The perception subsystems 132 can capture information about objects in a scene, including object type, object attribute (e.g., child, special vehicle, and turn signal), object property (e.g., human activity, sign), object coordinates, object speed, object heading, and object curvature, etc. For example, the perception subsystem can include a combination of sensor components that receive reflections of electromagnetic radiation, e.g., lidar systems that detect reflections of laser light, radar systems that detect reflections of radio waves, and camera systems that detect reflections of visible light. Additionally, the perception subsystems 132 can obtain predetermined environment information, e.g., information identifying lanes, stop signs, crossroads, etc.

Using the predetermined environment information and sensor captured information, the perception subsystems 132 can generate surrounding context information and object appearance information that can help to predict vehicle intent. Context information can be road context information represented by a sequence of top down rendered images, i.e., road graphs. In each rendered image, road information (e.g., lanes and stop signs), locations of surrounding objects (e.g., vehicles and pedestrians), and the vehicle itself, are rendered on an image from a top-down view. Appearance information can generally be any information that characterizes the visual appearance of a vehicle.

The perception subsystems 132 provide input data 155 to an on-board neural network subsystem 134. The input data 155 can include one or multiple channels of context information and appearance information captured by the perception subsystems 132. For example, the input data can include a sequence of top down rendered images characterizing one or more vehicles in an environment. In some implementations, the input data 155 can include embedding information derived from data generated by one or more sensors characterizes a scene in the vicinity of the autonomous vehicle. For example, the input data 155 can be or can include appearance embeddings or camera patches of the vehicles. The appearance embeddings can be computed using a previously trained appearance embedding neural network.

The perception subsystems 132, or the on-board neural network subsystem 134, or some combination of both, can transform raw perception data into the multiple channels of input data 155 that characterizes the appearance and context information of one or more vehicles in the environment. To do so, the on-board system 120 can project the various characteristics of the raw perception data into a common coordinate system.

The on-board neural network subsystem 134 implements the operations of each layer of a vehicle intent prediction neural network trained to make vehicle intent and trajectory predictions. Thus, the on-board neural network subsystem 134 includes one or more computing devices having software or hardware modules that implement the respective operations of each layer of the neural network according to an architecture of the neural network.

The on-board neural network subsystem 134 can implement the operations of each layer of the neural network by loading a collection of model parameter values 172 that are received from the training system 110. Although illustrated as being logically separated, the model parameter values 170 and the software or hardware modules performing the operations may actually be located on the same computing device or, in the case of an executing software module, stored within the same memory device.

The on-board neural network subsystem 134 can use hardware acceleration or other special-purpose computing devices to implement the operations of one or more layers of the neural network. For example, some operations of some layers may be performed by highly parallelized hardware, e.g., by a graphics processing unit or another kind of specialized computing device. In other words, not all operations of each layer need to be performed by central processing units (CPUs) of the on-board neural network subsystem 134.

The on-board neural network subsystem 134 uses the input data 155 to generate one or more vehicle intent predictions 165. The on-board neural network subsystem 134 can provide the one or more vehicle intent predictions 165 to a planning subsystem 136, a user interface subsystem 138, or both.

Each vehicle intent prediction includes respective predicted likelihoods for a plurality of possible intents and a corresponding predicted trajectory for each possible intent. As discussed above, the vehicle intent can be organized into multiple categories, e.g., one or more of going straight, turning left, turning right, left lane change, right lane change, stationary and reversing. For example, a vehicle intent prediction can include a probability of 0.8 for turning left, and a probability of 0.2 for going straight. Each vehicle intent prediction also includes a predicted trajectory that would be followed by the vehicle in a future time period if the vehicle follows the intent. In the example described above, a vehicle intent prediction can include a predicted trajectory for turning left during the next 10 seconds, and a predicted trajectory for going straight during the next 10 seconds. In some implementations, the predicted trajectory can include predicted positions of the vehicle at each of a plurality of future time steps.

When a planning subsystem 136 receives the one or more vehicle intent predictions 165, the planning subsystem 136 can use the one or more vehicle intent predictions 165 to make fully-autonomous or semi-autonomous driving decisions. For example, the planning subsystem 136 can generate a fully-autonomous plan based on the predicted intent and trajectory of a nearby vehicle driving in parallel with the vehicle itself, and navigate around the nearby vehicle. As another example, determining that an opposite vehicle plans to turn left at an intersection although currently stopped at a stop sign might cause the planning system 136 to properly yield to the opposite vehicle until the opposite vehicle finishes turning left.

A user interface subsystem 138 can receive the vehicle intent predictions 165 and can generate a user interface presentation that indicates one or more intents and/or trajectories of nearby vehicles. For example, the user interface subsystem 138 can generate a user interface presentation having image or video data containing a representation of the short-term trajectory and long-term intent of a nearby truck in the environment. An on-board display device can then display the user interface presentation for passengers of the vehicle 122.

The on-board neural network subsystem 134 can also use the input data 155 to generate training data 123. The on-board system 120 can provide the training data 123 to the training system 110 in offline batches or in an online fashion, e.g., continually whenever it is generated.

The training system 110 is typically hosted within a data center 112, which can be a distributed computing system having hundreds or thousands of computers in one or more locations.

The training system 110 includes a training neural network subsystem 114 that can implement the operations of each layer of a neural network that is configured to make vehicle intent predictions from input data that characterizing one or more vehicles in the environment. The training neural network subsystem 114 includes a plurality of computing devices having software or hardware modules that implement the respective operations of each layer of the neural network according to an architecture of the neural network.

The training neural network generally has the same architecture and parameters as the on-board neural network. However, the training system 110 need not use the same hardware to compute the operations of each layer. In other words, the training system 110 can use CPUs only, highly parallelized hardware, or some combination of these.

The training neural network subsystem 114 can compute the operations of each layer of the neural network using current parameter values 115 stored in a collection of model parameter values 170. Although illustrated as being logically separated, the model parameter values 170 and the software or hardware modules performing the operations may actually be located on the same computing device or on the same memory device.

The training neural network subsystem 114 can receive training examples 123 as input. The training examples 123 include input data as well as one or more labels that indicate the intent and trajectory of one or more vehicles within regions of space represented by the input data.

The training neural network subsystem 114 can generate, for each training example 123, one or more vehicle intent predictions 135. Each vehicle intent prediction 135 represents a predicted likelihood that the vehicle will follow the corresponding intent and a predicted trajectory that would be followed by the vehicle in a future time period if the vehicle follows the corresponding intent. A training engine 116 analyzes the vehicle intent predictions 135 and compares the vehicle intent predictions to the labels in the training examples 123. The training engine 116 then generates updated model parameter values 145 by using an appropriate updating technique, e.g., stochastic gradient descent with backpropagation. The training engine 116 can then update the collection of model parameter values 170 using the updated model parameter values 145.

After training is complete, the training system 110 can provide a final set of model parameter values 171 to the on-board system 120 for use in making fully autonomous or semi-autonomous driving decisions. The training system 110 can provide the final set of model parameter values 171 by a wired or wireless connection to the on-board system 120.

Figure 2:
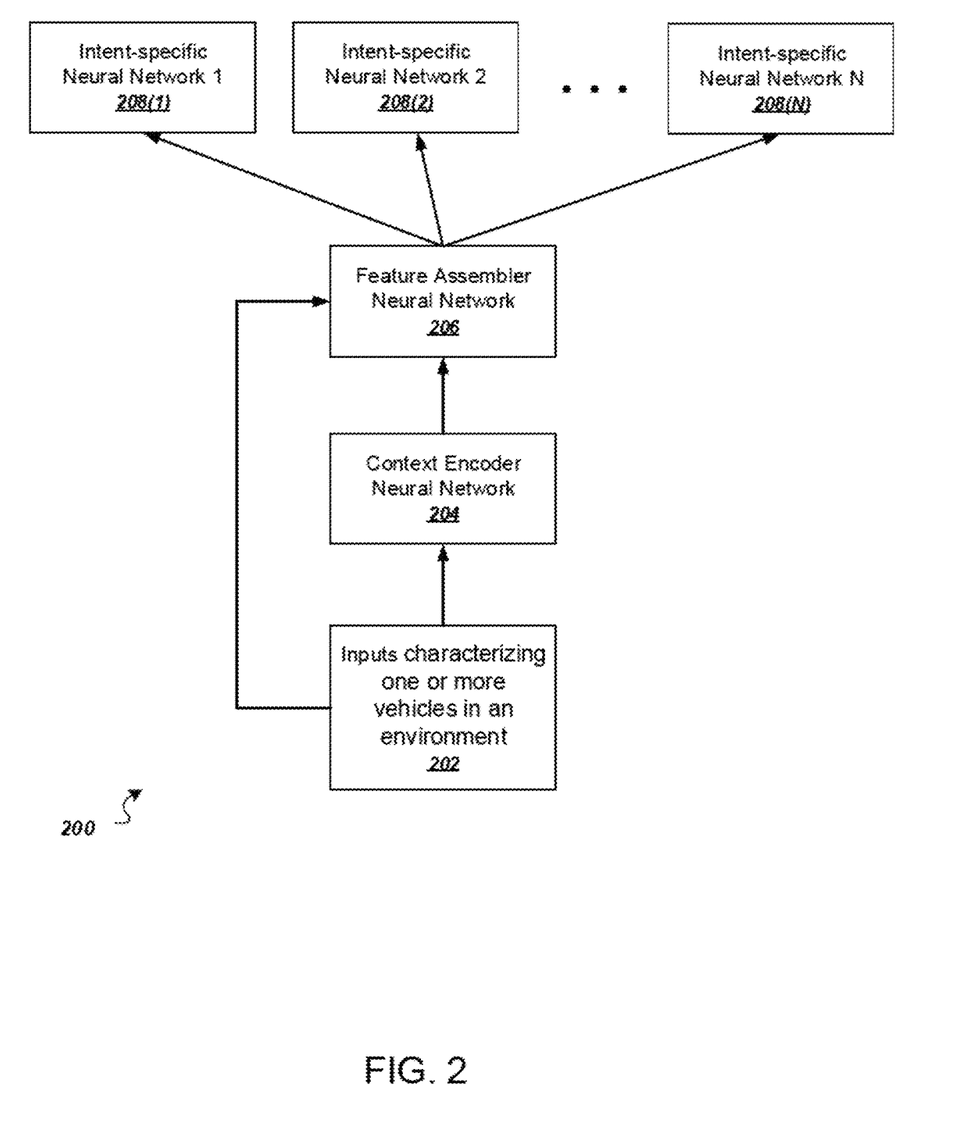
FIG. 2 illustrates an example architecture of a vehicle intent prediction neural network for making vehicle intent predictions from input data.

FIG. 2 illustrates an example architecture of a vehicle intent prediction neural network 200 for making vehicle intent predictions from input data 202. The input data 202 can be data generated or derived from the perception subsystems 132, i.e., from sensor data, that characterizes one or more vehicles in an environment. The input data 202 can include multiple frames of rendered images with a fixed time interval between each frame. For example, the input can include (i) 10 frames of rendered images with 0.1 seconds between every two frames characterizing history trajectory features of one or more vehicles in a scene, and (ii) appearance information of one or more vehicles in a scene. The rendered images of the input data 202 can include information identifying lanes, locations of the vehicle and road graphs including tracked objects in the vicinity of the vehicle. In some implementations, the input rendered image can also include heading information of a vehicle by rendering the heading information with a complementary color.

In some implementations, the appearance information is an appearance embedding of the input data 202 that characterizes an appearance of the vehicle and is generated from sensor data captured by one or more sensors of a particular other vehicle in the environment. For example, an appearance embedding of car A can be generated from a camera image captured by a camera installed on car B that is behind the car A. The appearance embedding can characterize the current visual appearance of car A, e.g., whether the left turn signal light of car A is currently on.

The network 200 includes a context encoder neural network 204 that takes input data 202 as input and outputs a context feature map that encodes the context information in the input data 202. For example, the context encoder neural network 204 can be a convolutional neural network that performs feature encoding from an initial set of measured data to build derived values, i.e., a set of features, intended to be informative about properties of the initial set of measured data. For example, a previously trained convolutional neural network can encode the rendered images and generate the road context feature map that includes the set of features.

The network 200 also includes a feature assembler neural network 206 that builds and assembles one or more context features and one or more appearance features for each vehicle in the environment. The feature assembly can be implemented by a concatenation or addition layer in a neural network architecture. The feature assembler neural network 206 takes as input a context feature map encoded by the context encoder neural network 204. The feature assembler neural network 206 can either directly assemble the context feature map or perform further encoding/embedding operations on the input context feature map before assembly. More details about the feature assembler neural network 206 is discussed in connection with FIG. 3.

In some implementations, the input data 202 can include previously calculated appearance embeddings, or other types of embedding representations of the environment. The feature assembler neural network 206 can take as input these previously calculated embedding representations for assembly. For example, if the input data 202 includes appearance embeddings of a vehicle, the feature assembler neural network 206 can directly assemble the appearance embeddings with a context feature map using a concatenation layer. In some implementations, the feature assembler neural network 206 can further process previously calculated embedding representations before assembly. For example, if the input data 202 includes appearance embeddings of a vehicle, the feature assembler neural network 206 can generate an appearance feature map from the previously calculated appearance embeddings of the vehicle by processing the embedding using a plurality of convolutional neural network layers and then assemble the generated appearance feature map with the context feature map using a concatenation layer.

The network 200 also includes a plurality of intent-specific neural networks 208(1), 208(2), through 208(N) that predict the intent categories and trajectories.

Each intent-specific neural network 208(1), 208(2), through 208(N) corresponds to a respective intent from a set of intents. Each intent-specific neural network is configured to process the features of the vehicle to generate an output for the corresponding intent. For example, when the vehicle intent is organized into seven categories, the network 200 can have N=7 intent-specific neural networks 208(1), through 208(7) configured to generate an intent prediction for each of the seven possible intent categories.

The output from each intent-specific neural network 208(1), 208(2), through 208(N) includes: (i) a confidence score that represents a predicted likelihood that the vehicle will follow the intent that corresponds to the intent-specific neural network, and (ii) a predicted trajectory that would be followed by the vehicle in a future time period if the vehicle follows the intent that corresponds to the intent-specific neural network.

In some implementations, the output confidence scores from the N intent-specific neural networks 208(1), 208(2), through 208(N) can represent a probability distribution of predicted intent among possible intent categories. The sum of all confidence scores can equal to 1. For example, the output confidence scores can be [0.1, 0.1, 0.4, 0.3, 0.05, 0.025, 0.025] for the seven intent categories described in the above example.

The architecture of the intent specific neural networks is described in more detail below with reference to FIG. 3.

Figure 3:
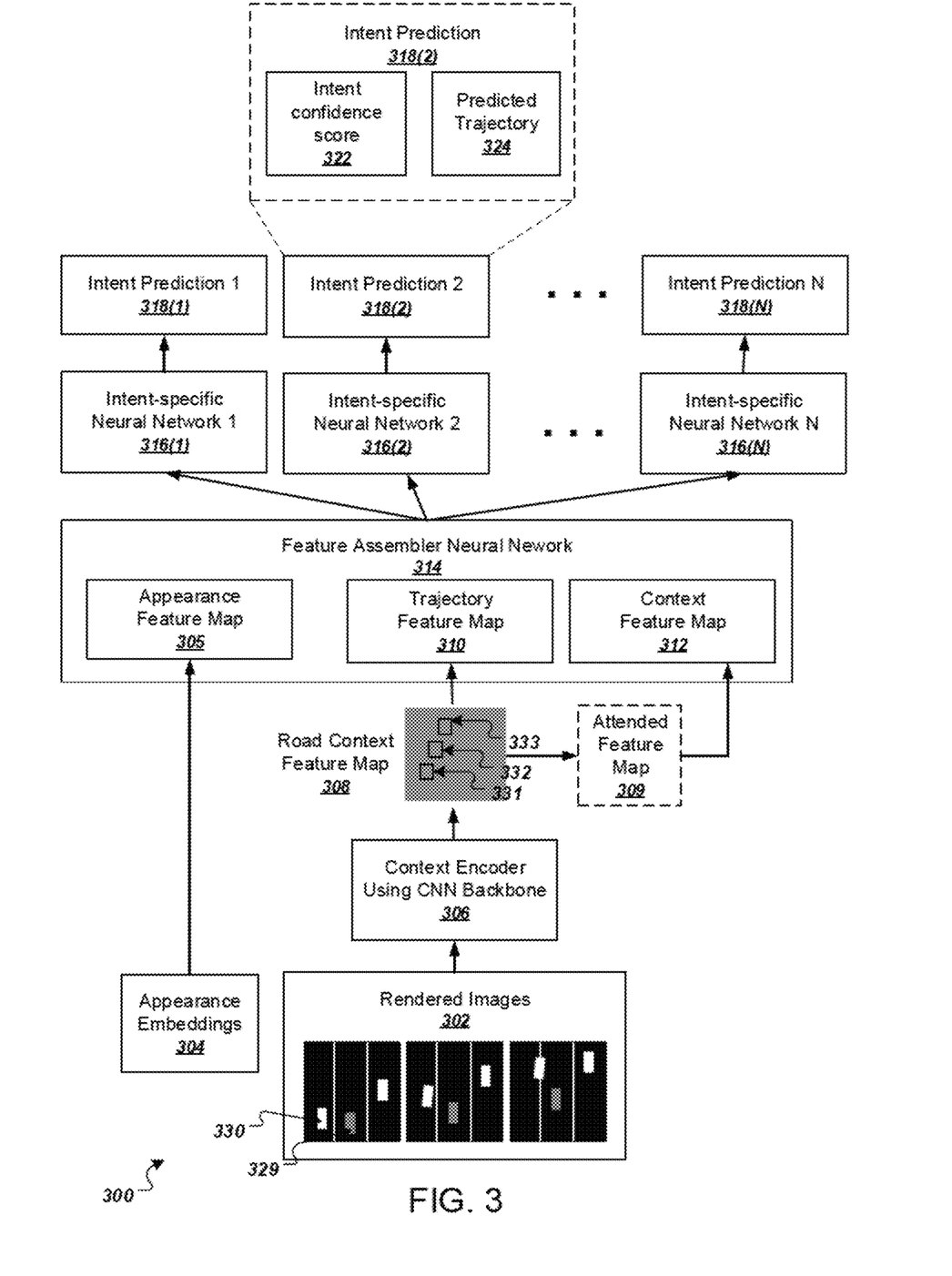
FIG. 3 illustrates an example architecture of a vehicle intent prediction neural network using a plurality of intent-specific neural networks.

FIG. 3 illustrates an example architecture 300 of a vehicle intent prediction neural network using a plurality of intent-specific neural networks 316(1), 316(2), through 316(N). The neural network architecture 300 is a more detailed example of the architecture 200 in FIG. 2. The input data to the neural network architecture 300 includes rendered images 302 and appearance embeddings 304. The vehicle intent prediction neural network 300 is configured to generate intent predictions for one or more vehicles from the input rendered images 302 and appearance embeddings 304.

The vehicle intent prediction neural network 300 can generate intent predictions for a single vehicle at once or for multiple vehicles at a time. To generate an intent prediction for multiple vehicles at once, the system can process the rendered images 302 to generate a respective input to the intent-specific neural networks for each of the vehicles and then process the The rendered images 302 can include a sequence of road graphs representing a sequence of history frames of a vehicle and its surrounding vehicles. The rendering position can be fixed at the vehicle's latest location. For example, the rendered images 302 include three road graphs, i.e., three frames, at three history time steps with rendering position fixed at the vehicle's latest location in the third frame. In the rendered images 302, the grey rectangles represent a vehicle 329 and the white rectangles represent two other vehicles near the vehicle 329. The sequence of rendered images 302 show that the vehicle 329 is moving in the middle lane and the vehicle 330 on the left side of the vehicle 329 is changing to the middle lane by cutting-in in front of the vehicle 329.

In some implementations, the rendered images 302 can be generated by a rendering processor in the on-board system 120 of the vehicle 122. The rendering processor can synchronize the vehicle pose and one or more tracked objects in the vicinity of the vehicle to a desired frequency and can maintain history buffers for the tracked objects and the vehicle pose. For example, information about poses of one or more tracked objects in the vicinity of the vehicle may come at variable frequencies, and the rendering processor can produce rendered images at a fixed frequency of 10 Hz.

The appearance embeddings 304 of a vehicle can characterize an appearance of the vehicle as sensed by one or more sensors of a particular other vehicle in the environment. In some implementations, the appearance embeddings 304 can include camera patches of a vehicle of interest. In some implementations, the appearance embeddings 304 can include appearance feature maps generated from one or more camera images using a pretrained appearance embedding neural network. The appearance embeddings 304 can include features of information identifying turn signal, heading, one or more tracked objects in the vicinity of the vehicle, object type, etc., of the vehicle. For example, the appearance embeddings 304 can include camera image patches and/or features extracted from camera images that can indicate whether the left-turn signal light of a vehicle is currently on.

The network 300 includes a context encoder 306 that uses a convolutional neural network (CNN) backbone. The context encoder 306 takes the rendered images 302 as input and outputs a road context feature map 308 for each of the vehicles in the environment. In some implementations, the context encoder 306 can process the one or more rendered images 302 of the environment to generate a feature map that includes a respective feature vector for each of a plurality of positions of each of the vehicles in the environment. For example, the context encoder 306 can generate a feature map that includes three respective feature vectors for the three positions of the vehicle 329 in the three rendered images 302.

Generally, the context encoder 306 uses a convolutional neural network that includes a number of convolutional layers and optionally, a number of deconvolutional layers. Each convolutional layer or deconvolutional layer has parameters whose values define the filters for the layer.

In some implementations, the context encoder 306 can use an AlexNet style CNN backbone (Krizhevsky, Alex, et al. "Imagenet classification with deep convolutional neural networks." Advances in neural information processing systems. 2012), which includes a number of convolutional layers, pooling layers, and optionally, fully connected layers. For example, from an input rendered image having dimension 256×256, a 4-layer AlexNet that has four 2×2 pooling layers can generate a road context feature vector having dimensions 16×16×32. From three input rendered images 302 each having dimension 256×256, a 4-layer AlexNet can generate a road context feature map having dimensions 16×16×32×3. The road context feature map includes three feature vectors, and each feature vector has dimension 16×16×32, corresponds to each of the three rendered images 302. Each feature vector includes features of each of the three vehicles in the corresponding rendered image.

In some implementations, the context encoder 306 can use a ResNet style CNN backbone (He, Kaiming, et al. "Deep residual learning for image recognition." Proceedings of the IEEE conference on computer vision and pattern recognition. 2016). For example, the context encoder 306 can use the block-1 of ResNet-18 as backbone to generate a road context feature map 308. The ResNet style backbone may provide the benefit of lower latency, e.g., reducing the amount of computation needed, without reducing the accuracy of the vehicle intent prediction neural network 300.

In some implementations, based on the feature vectors in the road context feature map 308, the network 300 can be configured to generate one or more other feature maps, e.g., a trajectory feature map 310, and a context feature map 312.

In some implementations, the network 300 can be configured to generate a trajectory feature map 310 with the following steps: (i) for a vehicle 330 in the environment, obtaining a position of the vehicle 330 in each of the input rendered images 302 of the environment; (ii) obtaining a plurality of cropped feature vectors 331, 332 and 333 which include a respective feature vector for each position of the vehicle by cropping the road context feature map 308 based on each position of the vehicle; (iii) generating a trajectory feature map 310 of the vehicle 330 by performing average-pooling operation over the plurality of cropped feature vectors, i.e., temporal average-pooling. The trajectory feature map 310 can capture local features of each vehicle in the environment by extracting a feature patch by the vehicle's position on the feature map.

For example, based on a road context feature map 308 having dimension 16×16×32×3 and positions of the vehicle 330 in each of the three input rendered images, the network 300 can be configured to obtain three cropped feature vectors centering on the vehicle 330, each having dimension 4×4×32. Then the network 300 can be configured to generate a trajectory feature map 310 of the vehicle 330 by performing temporal average pooling operations over the three cropped feature vectors. The generated trajectory feature map 310 has dimension 4×4×32.

In some implementations, the network 300 can be configured to generate a context feature map 312 for a vehicle 330 by performing an average-pooling operation over the feature vectors in the road context feature map 308, i.e., spatial average-pooling. The context feature map 312 can capture global features by performing spatial average-pooling from the whole feature map.

For example, based on a road context feature map 308 having dimension 16×16×32×3, the network 300 can be configured to generate a context feature map having dimension 4×4×32×3 by performing spatial average-pooling operation over the feature vectors.

In some implementations, before generating one or more other feature maps, e.g., a trajectory feature map 310, or a context feature map 312, the network 300 can be configured to apply a self-attention mechanism to the road context feature map 308 to generate an attended feature map 309. Then the network 300 can be configured to generate the one or more other feature maps, e.g., the trajectory feature map 310, or the context feature map 312, based on the attended feature map 309. The attended feature map 309 can implicitly model agent, i.e., vehicle, interactions and can therefore help generating more meaningful feature maps, e.g., the context feature map 312.

An attention mechanism (Vaswani, Ashish, et al. "Attention is all you need." Advances in neural information processing systems. 2017) can be described as mapping a query and a set of key-value pairs to an output, where the query, keys, values and output are all vectors. For example, the network 300 can be configured to implement a Scaled Dot-Product Attention function as following:

$$\text{Attention}(Q, K, V) = \text{softmax}\left(\frac{QK^T}{\sqrt{d_k}}\right)V, \quad (1)$$

wherein Q is a set of queries packed together into a matrix, K is a vector of the keys, V is a vector of the values, $d_k$ is the dimension of the keys, $K^T$ is the transfer matrix of the vector K, and softmax( ) is a softmax function. The network 300 can be configured to apply the attention function in equation (1) to the road context feature map 308 to generate an attended feature map 309. Based on the attended feature map 309, the network can be configured to generate a context feature map 312.

The network 300 includes a feature assembler neural network 314 that assembles an appearance feature map 305, a trajectory feature map 310, and a context feature map 312 for each vehicle in the environment. The feature assembly neural network 314 can be implemented as a concatenation or addition layer. For example, for a vehicle 330 in the environment, the feature assembler neural network 314 can concatenate or average the appearance feature map corresponding to the vehicle, the trajectory feature for the vehicle, and the context feature to generate a single tensor.

The appearance feature map 305 can be the same as the appearance embeddings 304. In some implementations, the feature assembler neural network 314 can perform further encoding/embedding operations on the input appearance embeddings 304 and can generate the appearance feature map 305 using one or more convolutional layers. Similarly, the trajectory feature map 310 and/or the context feature map 312 can also be generated or further processed by the feature assembler neural network 314 using one or more convolutional layers.

The network 300 includes a fixed number of intent-specific neural networks 316(1), 316(2), through 316(N) that can output a fixed number of intent predictions 318(1), 318(2), through 318(N). An intent-specific neural network 316(2) is an example of one of the intent-specific neural networks 316(1), 316(2), through 316(N). An intent prediction 318(2) is an example of one of the intent predictions 318(1), 318(2), through 318(N). For example, when the vehicle intent is organized into seven categories, the network 300 can have N=7 intent-specific neural networks 316(1), through 316(7) configured to generate intent predictions 318(1), through 318(7) for each of the seven possible intent categories.

Each intent-specific neural network, e.g., intent-specific neural network 316(2), takes an assembled feature map as input and outputs an intent prediction, e.g., intent prediction 318(2), including an intent confidence score 322 and a predicted trajectory 324. Each intent-specific neural network can include one or more fully-connected neural network layers that are configured to generate an intent prediction for the corresponding intent from the assembled feature maps. Each intent-specific neural network can be an intent decoder that decodes the assembled feature map.

In some implementations, each intent-specific neural network, e.g., intent-specific neural network 316(2), can include: (i) one or more fully-connected neural network layers that are configured to generate an intent confidence score 322; (ii) one or more auto-regressive neural network layers that are configured to auto-regressively generate the predicted trajectory 324. The intent confidence score 322 and the predicted trajectory 324 are output heads of the intent-specific neural network 316(2).

Each intent confidence score 322 represents a predicted likelihood that the vehicle will follow the intent that corresponds to the intent-specific neural network 316(2). Each predicted trajectory 324 represents a trajectory that would be followed by the vehicle in a future time period if the vehicle follows the intent 322 that corresponds to the intent-specific neural network 316(2). For example, the intent-specific neural network 316(2) for left-turn intents can output intent prediction 318(2) that includes: (i) a left-turn intent confidence score of 0.5, i.e., the probability that the vehicle is planning to turn left being 50%; and (ii) a predicted left-turn trajectory in the next 10 seconds.

In some implementations, the intent-specific neural networks 316(1), 316(2), through 316(N) can share one or more neural network layers. For example, the intent-specific neural networks 316(1), 316(2), through 316(N) can share one or more fully-connected layers. As another example, the intent-specific neural networks 316(1), 316(2), through 316(N) can share a classification layer that outputs N confidence score in the output heads of the classification layer. The shared classification layer can output a probability distribution of N possible intents, and the sum of all N confidence scores equals to 1.

In some implementations, the predicted trajectory 324 can include predicted positions of the vehicle at each of a plurality of future time steps. In some implementations, the predicted trajectory can include predicted coordinates, e.g., (x, y), at each of a plurality of future time steps at a fixed interval, e.g., every 0.1 second. For, example, the predicted trajectory 324 can be (x, y) coordinates at the next 0.1 second, the next 0.2 second, through the next 1.0 second.

In some implementations, each intent-specific neural network, e.g., intent-specific neural network 316(2), can include one or more auto-regressive neural network layers that includes recurrent neural network (RNN) layers (Cleeremans, Axel, et al. "Finite state automata and simple recurrent networks." Neural computation 1.3 (1989): 372-381). For example, each intent-specific neural network can include a vanilla RNN that follows the equations:

$$\text{intent} = f_{CLS}(h_0),$$

$$h_t = f_{RNN}(h_{t-1}, \text{traj}_{t-1}, \text{intent}),$$

$$\text{traj}_t = f_{TRAJ}(h_t).$$

where $h_t$ stands for the hidden state of an RNN at step t, the hidden state for the first step $h_o$ could take value from yjr context encoder 306 or be set to a predetermined default value, $f_{RNN}$ stands for the recurrent update function, i.e., for the processing of the RNN, intent stands for the discretized intent labels such as left turn or right turn, and $\text{traj}_t$ stands for the predicted trajectory offset at step t. $\text{traj}_t$ is the output of $f_{TRAJ}$ which is implemented with a neural network, e.g., implemented by applying one or more fully-connected layers to the hidden state $h_t$. To accelerate the inference speed, in some implementations, each prediction step of RNN predicts multiple future steps of coordinates. That is, $\text{traj}_t$ can include coordinates for multiple future time steps. Thus, the RNN does not have to perform processing for each future time step in the predicted trajectory.

In some implementations, each intent-specific neural network can include output heads for the predicted trajectory 324 that include a plurality of neural network layers to predict means and variances of Gaussian distribution of the trajectory coordinates. During training of the neural network 300, a loss term, e.g., negative log-likelihood loss, can balance accuracy, e.g., L2 distances of means, and uncertainty, e.g., variances. Therefore, after training, the neural network 300 can be more robust to outliers.

In some implementations, each intent-specific neural network can generate trajectories multiple steps at a time. When the predicted trajectory includes predicted positions of the vehicle for a plurality of future time steps, the plurality of future time steps can be divided into a plurality of partitions. The auto-regressive neural network layers can be configured to generate, for each partition, the predicted position of the vehicle for the partition conditioned on predicted position for earlier partitions.

In some implementations, each partition can include more than one future time step. Generating trajectories multiple steps at a time can help reduce a latency problem in the RNN by reducing the number of processing steps that are required to predict an entire trajectory.

For example, the plurality of future time steps t(0), t(1), t(2), t(3), t(4) ... can be divided into multiple groups of time steps. Each group can include k time steps, resulting in group 1 having k time steps t(0), t(1), ..., t(k−1), group 2 having k time steps t(k), t(k+1), ..., t(2k−1), etc. The auto-regressive neural network layers can include RNN layers that are configured to generate predicted positions of the vehicle for each group at each output head, instead of generating predicted position for one time step at each output head. For example, the first output head of the RNN can output the predicted positions at time steps t(0), t(1), ..., t(k−1). The second output head of the RNN can output the predicted positions at time steps t(k), t(k+1), ..., t(2k−1) conditioned on the predicted positions for the earlier group at time steps t(0), t(1), ..., t(k−1). Instead of generating a single output t(0) at the first output head, and a single output t(1) at the second output head, the RNN is configured to generate k predicted positions from each output head. This RNN architecture can help reduce the RNN latency because predictions for more than one positions can be generated simultaneously from a single output head of the RNN.

In some implementations, each intent-specific neural network can include three output heads: (i) a classification head for intent classification; (ii) a regression head for multi-trajectory prediction; and, optionally, (iii) a regression head for heading prediction. That is, each intent-specific neural network can also have a third output head that predicts the heading of the vehicle if it has the corresponding intent, where the heading is an orientation of a particular part of the vehicle, e.g., the front of the vehicle, in a particular coordinate system. Each output head generally includes one or more neural network layers having an architecture that allows the output head to map the input to the head to the corresponding type of output required from the head.

Figure 4:
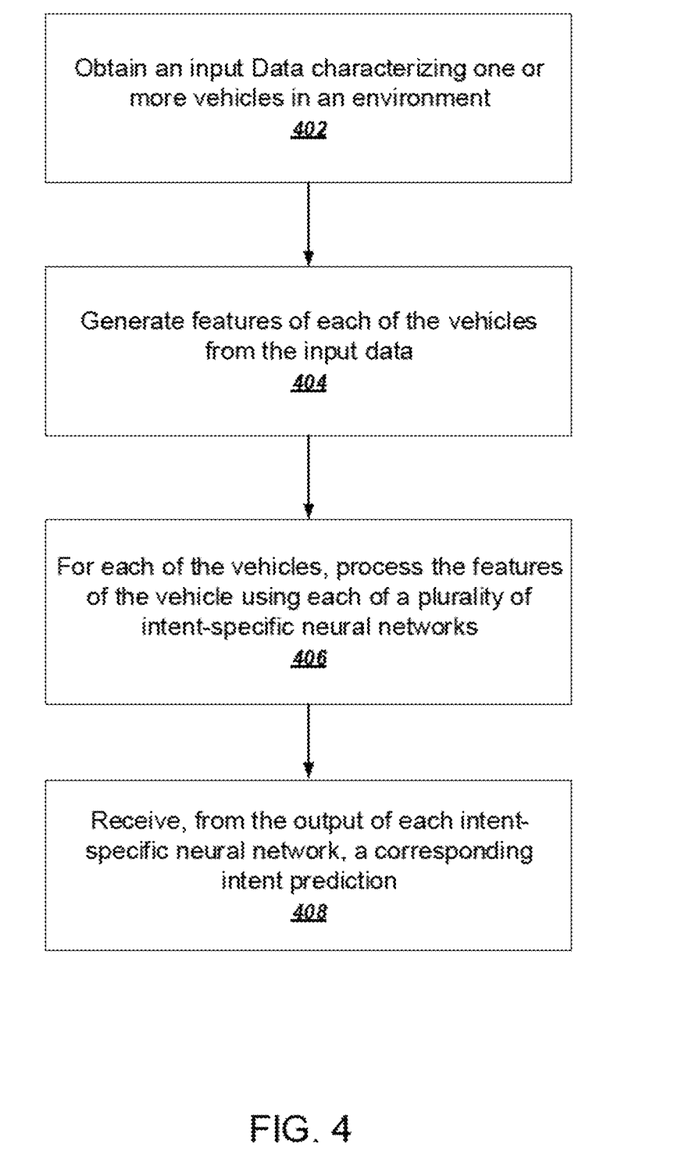
FIG. 4 is a flow chart of an example process for computing vehicle intent prediction from input data.

FIG. 4 is a flow chart of an example process 400 for computing vehicle intent prediction from input data. The example process in FIG. 4 uses a forward inference pass through a neural network that has already been trained or is being trained to make vehicle intent predictions. The example process can thus be used during training or to make predictions from unlabeled input, e.g., in a production system. The process will be described as being performed by an appropriately programmed neural network system.

The system obtains input data characterizing one or more vehicles in an environment (402). The input data can include one or more images of the environment that include one or more vehicles. For example, the input data can include a sequence of rendered images that include information identifying one or more tracked objects in the vicinity of the vehicle, history trajectory information of the one or more vehicles in the environment. For each of the vehicle in the environment, the input data can include appearance embeddings of the vehicle that characterize a visual appearance of the vehicle as sensed by one or more sensors of a particular other vehicle in the environment. For example, the appearance embeddings can include a camera image patch of the left-turn signal light of a vehicle.

The system generates features of each of the vehicles from the input data (404). The architecture of an example neural network that is suitable for generating features of each of the vehicles from input is described in more detail above with reference to FIG. 2 and FIG. 3. The generated features can include a trajectory feature map and a context feature map. The system can use a feature assembler neural network to assemble the generated trajectory feature map, the generated context feature map, and the appearance feature map obtained from an appearance embedding. An assembled feature map can include local features and global features of a vehicle.

For each of the vehicles, the system processes the features of the vehicle using each of a plurality of intent-specific neural networks (406). The architecture of an example intent-specific neural network that is suitable for generating intents and trajectories of each of the vehicles from assembled feature maps is described in more detail above with reference to FIG. 2 and FIG. 3. Each intent-specific neural network can include a first output head to predict a confidence score for a particular intent, and a second output head to predict a corresponding predicted trajectory for that particular intent.

The system receives, from the output of each intent-specific neural network, a corresponding intent prediction for each of the vehicles (408). As described above, each intent prediction can include a confidence score of an intent and a predicted trajectory for the corresponding intent. The predicted trajectory can include predicted positions, e.g., coordinates, of the vehicle at each of a plurality of future time steps.

After generating vehicle intent predictions, the system can take different actions depending on whether the forward inference pass is being used for training or in a production system. During training, the vehicle intent predictions can be used to compute one or more errors based on the labels in the training example used. The errors can be used to compute updated weights for the neural network, which can be computed and updated using any appropriate training technique, e.g., gradient descent with backpropagation.

When used in an on-board production system, the vehicle intent predictions can be provided to a planning subsystem that makes decisions about how the vehicle should react to the predicted intents of the vehicles in the environment.

Figure 5:
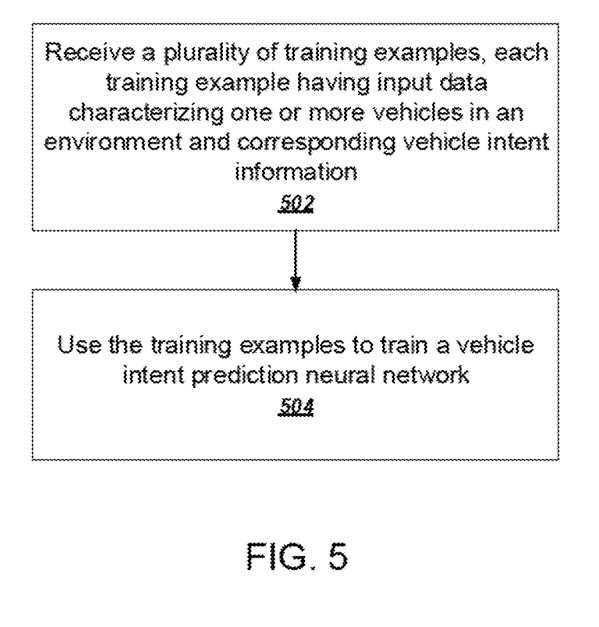
FIG. 5 is a flow chart of an example process for training a vehicle intent prediction neural network.

FIG. 5 is a flow chart of an example process for training a vehicle intent prediction neural network. The process will be described as being performed by an appropriately programmed neural network system, e.g., the training system 110 of FIG. 1.

The system receives a plurality of training examples, each training examples having input data characterizing one or more vehicles in an environment and corresponding vehicle intent information (502). As discussed above, the input data can be generated from the perception subsystem 132 in the on-board system 120 or another system. The vehicle intent information can be one or more labels, in which each label can indicate an intent and a corresponding trajectory of a vehicle.

The labels can be automatically obtained by rule based methods. For example, a lane change intent can be determined based on whether there has been lane change in neighboring lanes between k seconds. For example, a left or right turn intent can be determined based on a curvature information of a vehicle is larger than a threshold. For example, stationary intent, going straight intent, or reversing intent can be determined based on vehicle heading information and velocity information. Alternatively or in combination, the labels can be obtained by crowd compute labeling performed by human labelers.

The system uses the training examples to train a vehicle intent prediction neural network (504). The system can use a plurality of intent-specific neural networks to process local and global features of a vehicle in the environment and can generate an output for a corresponding intent for each of the plurality of intent-specific neural networks. Each intent prediction can include a confidence score and a predicted trajectory that would be followed by the vehicle in a future time period.

The system can compare the intent prediction to the labels in the training examples. The system can calculate a loss which can measure the difference between the intent prediction and the labels in the training example. The loss can include: (1) an intent classification loss, e.g., sigmoid loss; and (2) a trajectory regression loss, e.g., smooth L1 loss between the predicted coordinates and the labeled coordinates at a series of future time steps. In some implementations, the loss can further include a realistic loss over the predicted trajectory. For example, a predicted trajectory with a zig-zag shape is unrealistic and the predicted trajectory with the zig-zag shape can generate a higher realistic loss value indicating that the predicted trajectory is unlikely to happen in real world by measuring the frequency and level of change of the heading of the vehicle. For example, a loss function that includes a trajectory regression loss with smooth L1 loss, an intent classification loss with sigmoid loss, and a realistic loss over the predicted trajectory can be formulated as the following:

$$L1_{smooth}(t,\hat{t}) + CE_{sigmoid}(c,\hat{c}) + \text{Realistic}(\hat{t}),$$

where the ground truth intent is $c$, the predicted intent is $\hat{c}$, the ground truth trajectory that corresponds to the intent $c$ is trajectory $t$, and the predicted trajectory that corresponds to the intent $\hat{c}$ is trajectory $\hat{t}$.

In some implementations, a vehicle intent prediction neural network can predict means and variances of Gaussian distributions of the trajectory coordinates. In other words, instead of directly regressing the coordinates, the system predicts the parameters of a probability distribution, i.e., a Gaussian distribution, over possible values for each of the coordinates. In this case, the trajectory prediction output head can have one or more output layers that predict respective means for both the x and y coordinate and one or more output layers that predict respective variacnes for both the x and y coordinate. For example, for both means and variances, the neural networks can have fully connected layers with relu nonlinearities, where the final output has the same size of 2, corresponding to x, y coordinates. The final fully-connected layer for the mean network has no nonlinearity, while the final fully-connected layer for the variance network has a softplus nonlinearity to make variances nonnegative.

In these implementations, instead of training using an L2 or other distance-based loss, the system can directly compute the negative loglikelihood loss on the Gaussian probabilities, in order to perform max-likelihood training. Training neural network models with this loss may be more robust against outliers, as the loss term balances the L2 distances between the groundtruth trajectories and predicted means, and the uncertainty based on the predicted variances.

The system can generate updated model parameter values based on a loss by using an appropriate updating technique, e.g., stochastic gradient descent with backpropagation. The system can then update the collection of model parameter values using the updated model parameter values.

In some implementations, when each intent-specific neural network includes one or more RNN layers, each intent-specific neural network can include output heads for the predicted trajectory 324 that include a plurality of neural network layers for curriculum learning (Bengio, Yoshua, et al. "Curriculum learning." Proceedings of the 26th annual international conference on machine learning. ACM, 2009) in order to help long sequence generation. The curriculum learning can include a number of curriculum strategies, e.g., a teacher forcing strategy and a scheduled sampling strategy, etc. The teacher forcing strategy can allow the neural network to learn to predict $traj_t$ from ground truth $traj_{t-1}$, instead of prediction of $traj_{t-1}$. The scheduled sampling strategy can apply the teacher forcing strategy at the beginning of a training process, and then can gradually remove the teacher forcing strategy.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
    obtaining, by an autonomous vehicle navigating in an environment, an input characterizing one or more other vehicles in the environment;
    generating, by the autonomous vehicle and from the input, features of each of the one or more other vehicles;
    for each of the one or more other vehicles:
        processing, by the autonomous vehicle, the features of the other vehicle using each of a plurality of intent-specific neural networks, wherein each of the intent-specific neural networks corresponds to a respective intent from a set of intents, wherein each intent from the set of intents is an action goal for the other vehicle over a first time scale, and wherein each intent-specific neural network is configured to process the features of the other vehicle to generate an output for the corresponding intent that includes:
            (i) a confidence score that represents a predicted likelihood that the other vehicle will follow the intent that corresponds to the intent-specific neural network, and
            (ii) a predicted trajectory that would be followed by the other vehicle in a future time period if the other vehicle follows the intent that corresponds to the intent-specific neural network, wherein the predicted trajectory is a sequence of predicted positions of the other vehicle over a second time scale that is shorter than the first time scale; and
    controlling the autonomous vehicle navigating in the environment based on the outputs generated by the plurality of intent-specific neural networks for each of the one or more other vehicles.

2. The method of claim 1, wherein controlling the autonomous vehicle navigating in the environment based on the outputs comprises:
    providing the outputs generated by the plurality of intent-specific neural networks for each of the one or more other vehicles to a planning system that plans navigation of the autonomous vehicle navigating in the environment.

3. The method of claim 1, wherein the input comprises, for each of the one or more other vehicles, an appearance embedding of the other vehicle that characterizes an appearance of the other vehicle as sensed by one or more sensors of a particular other vehicle in the environment.

4. The method of claim 1, wherein the input comprises one or more images of the environment, and wherein generating the features of each of the one or more other vehicles comprises:
  processing the one or more images of the environment using a convolutional neural network to generate a feature map that includes a respective feature vector for each of a plurality of positions in the environment; and
  generating, for each of the one or more other vehicles, features based on the feature vectors in the feature map.

5. The method of claim 4, wherein generating, for each of the one or more other vehicles, features based on the feature vectors in the feature map comprises:
  obtaining a position of the other vehicle in each of the one or more images of the environment;
  obtaining a plurality of cropped feature vectors, comprising a respective feature vector for each position of the other vehicle by cropping the feature map based on each position of the other vehicle; and
  generating a trajectory feature map of the other vehicle by performing average-pooling operation over the plurality of cropped feature vectors.

6. The method of claim 4, wherein generating, for each of the one or more other vehicles, features based on the feature vectors in the feature map comprises:
  generating a context feature map of the other vehicle by performing average-pooling operation over the feature vectors in the feature map.

7. The method of claim 4, wherein generating, for each of the one or more other vehicles, features based on the feature vectors in the feature map comprises:
  applying a self-attention mechanism to the feature map to generate an attended feature map; and
  generating the features based on the attended feature map.

8. The method of claim 1, wherein, for each of the one or more other vehicles, the predicted trajectory comprises predicted positions of the other vehicle at each of a plurality of future time steps.

9. The method of claim 1, wherein each intent-specific neural network is one or more fully-connected neural network layers that are configured to generate the output for the corresponding intent from the features.

10. The method of claim 1, wherein each intent-specific neural network comprises:
  one or more fully-connected neural network layers that are configured to generate the confidence score; and
  one or more auto-regressive neural network layers that are configured to auto-regressively generate the predicted trajectory.

11. The method of claim 10, wherein the one or more auto-regressive neural network layers are recurrent neural network layers.

12. The method of claim 10, wherein, for each of the one or more other vehicles, the predicted trajectory comprises predicted positions of the other vehicle for each of a plurality of future time steps, wherein the plurality of future time steps are divided into a plurality of partitions, and wherein the auto-regressive neural network layers are configured to generate, for each partition, the predicted positions of the other vehicle for the partition conditioned on predicted positions for earlier partitions.

13. The method of claim 12, wherein each partition includes more than one future time step.

14. The method of claim 1, wherein each predicted trajectory is a sequence of predicted positions of the other vehicle.

15. The method of claim 1, wherein the set of intents includes one or more of:
  going straight, turning left, turning right, left lane change, right lane change, remaining stationary, or reversing.

16. A system comprising one or more computers and one or more storage devices storing instructions that when executed by the one or more computers cause the one or more computers to perform operations comprising:
  obtaining, by an autonomous vehicle navigating in an environment, an input characterizing one or more other vehicles in the environment;
  generating, by the autonomous vehicle and from the input, features of each of the one or more other vehicles;
  for each of the one or more other vehicles:
    processing, by the autonomous vehicle, the features of the other vehicle using each of a plurality of intent-specific neural networks, wherein each of the intent-specific neural networks corresponds to a respective intent from a set of intents, wherein each intent from the set of intents is an action goal for the other vehicle over a first time scale, and wherein each intent-specific neural network is configured to process the features of the other vehicle to generate an output for the corresponding intent that includes:
      (i) a confidence score that represents a predicted likelihood that the other vehicle will follow the intent that corresponds to the intent-specific neural network, and
      (ii) a predicted trajectory that would be followed by the other vehicle in a future time period if the other vehicle follows the intent that corresponds to the intent-specific neural network, wherein the predicted trajectory is a sequence of predicted positions of the other vehicle over a second time scale that is shorter than the first time scale; and
  controlling the autonomous vehicle navigating in the environment based on the outputs generated by the plurality of intent-specific neural networks for each of the one or more other vehicles.

17. The system of claim 16, wherein controlling the autonomous vehicle navigating in the environment based on the outputs comprises:
  providing the outputs generated by the plurality of intent-specific neural networks for each of the one or more other vehicles to a planning system that plans navigation of the autonomous vehicle navigating in the environment.

18. The system of claim 16, wherein the input comprises, for each of the one or more other vehicles, an appearance embedding of the other vehicle that characterizes an appearance of the other vehicle as sensed by one or more sensors of a particular other vehicle in the environment.

19. The system of claim 16, wherein the input comprises one or more images of the environment, and wherein generating the features of each of the one or more other vehicles comprises:
  processing the one or more images of the environment using a convolutional neural network to generate a feature map that includes a respective feature vector for each of a plurality of positions in the environment; and
  generating, for each of the one or more other vehicles, features based on the feature vectors in the feature map.

20. One or more non-transitory computer-readable storage media storing instructions that when executed by one or more computers cause the one or more computers to perform operations comprising:

obtaining, by an autonomous vehicle navigating in an environment, an input characterizing one or more other vehicles in the environment;

generating, by the autonomous vehicle and from the input, features of each of the one or more other vehicles;

for each of the one or more other vehicles:

processing, by the autonomous vehicle, the features of the other vehicle using each of a plurality of intent-specific neural networks, wherein each of the intent-specific neural networks corresponds to a respective intent from a set of intents, wherein each intent from the set of intents is an action goal for the other vehicle over a first time scale, and wherein each intent-specific neural network is configured to process the features of the other vehicle to generate an output for the corresponding intent that includes:

(i) a confidence score that represents a predicted likelihood that the other vehicle will follow the intent that corresponds to the intent-specific neural network, and             (ii) a predicted trajectory that would be followed by the other vehicle in a future time period if the other vehicle follows the intent that corresponds to the intent-specific neural network, wherein the predicted trajectory is a sequence of predicted positions of the other vehicle over a second time scale that is shorter than the first time scale; and     controlling the autonomous vehicle navigating in the environment based on the outputs generated by the plurality of intent-specific neural networks for each of the one or more other vehicles.

* * * * *